United States Patent [19]
Röhm

[11] Patent Number: 5,145,192
[45] Date of Patent: Sep. 8, 1992

[54] LOCKABLE DRILL CHUCK

[76] Inventor: Günter H. Röhm, Heinrich-Röhm-Strasse 50, D-7927 Sontheim, Fed. Rep. of Germany

[21] Appl. No.: 734,138

[22] Filed: Jul. 22, 1991

[30] Foreign Application Priority Data

Jul. 21, 1990 [DE] Fed. Rep. of Germany ....... 4023303
Dec. 6, 1990 [DE] Fed. Rep. of Germany ... 9016578[U]
Jan. 29, 1991 [EP] European Pat. Off. ......... 91101106.2

[51] Int. Cl.⁵ ............................................. B23B 31/12
[52] U.S. Cl. .................................... 279/62; 279/140; 279/902
[58] Field of Search ............... 279/1 K, 1 ME, 60-65, 279/140, 902

[56] References Cited
U.S. PATENT DOCUMENTS 3,807,745  4/1974  Bent .................................. 279/62 X
4,381,116  4/1983  Futter .................................. 279/62

Primary Examiner—Steven C. Bishop
Attorney, Agent, or Firm—Herbert Dubno; Andrew Wilford

[57] ABSTRACT

A drill chuck has a chuck body centered on and adapted to be rotated about a longitudinal axis and unitarily formed with a plurality of forwardly open angled guides angularly spaced about the axis and an axially forwardly directed shoulder. Respective jaws displaceable along the guides in the chuck body are each formed with a row of teeth and a tightening sleeve rotatably surrounds the body and has an axially rearwardly directed shoulder. An inner ring rotatable on the body about the axis is formed internally with a screwthread meshing with the teeth of the jaws so that rotation of the inner ring in one direction moves the jaws radially together and opposite rotation moves them radially apart. This inner ring bears axially forward on the shoulder of the sleeve and axially backward on the shoulder of the body. Interengaging formations rotationally couple the inner ring to the sleeve and a retaining element axially fixed on the chuck body forward of the inner ring bears axially backward on the sleeve. The chuck body has axially rearward of the interengaging formations a predetermined outside diameter and the sleeve has axially rearward of the interengaging formations a predetermined inside diameter greater than the outside diameter of the body. The ring has a predetermined outside diameter smaller than the inside diameter of the sleeve so that the ring can be fitted axially forward into the sleeve and the sleeve and ring together can be fitted axially backward over the body.

14 Claims, 3 Drawing Sheets

LOCKABLE DRILL CHUCK

FIELD OF THE INVENTION

The present invention relates to a drill chuck. More particularly this invention concerns a drill chuck usable on a hammer drill and provided with a mechanism that allows it to be locked.

BACKGROUND OF THE INVENTION

A standard hammer-drill chuck that is rotated about an axis of a drill spindle to rotate a drill bit about and reciprocate it along the axis has a chuck body securable to the spindle and formed centered on the axis with a screwthread. A collar rotatable but axially nondisplaceable on the chuck body is formed angularly equispaced about the axis with a plurality of angled jaw guides, although it is possible to form the guides on the chuck body and the screwthread on the collar for the same effect. Respective jaws in the guides have racks that mesh with the screwthread so that rotation of the collar on the chuck body about the axis in a tightening direction moves the jaws radially together and opposite rotation in a loosening direction moves the jaws radially apart. As described in U.S. Pat. No. 4,955,623, a locking ring is provided that is limitedly angularly displaceable relative to the chuck body but nonrotatable thereon. In addition this ring is formed with teeth or other formations that mesh axially with complementary formations on the collar and the ring is axially displaceable on the chuck body between a back unlocked position with the formations disengaged and relative rotation of the ring and collar possible, and a front position with the formations in mesh and such relative rotation impossible. The function of this ring is to prevent accidental opening of the chuck.

As described in European patent application 059,030 the tightening collar comprises an outer sleeve and, rotationally fixed therein, an inner ring. The inner ring is formed of one piece with the screwthread that meshes with the teeth on the edges of the jaws. To assemble the chuck this ring is slipped on the chuck body from the front and then secured thereon against axial movement. The sleeve is made of sheet metal and is slipped over the assembly from the rear and is crimped or otherwise force-fitted to the inner ring. Such mounting creates problems, especially when self-tightening forces exist, since the rotational coupling between the sleeve and the ring is stressed considerably between the locking ring connected at the rear end to the adjustment sleeve and preventing its rotation and the inner ring force-fitted to its front end and urged rotationally by the jaws.

OBJECTS OF THE INVENTION

It is therefore an object of the present invention to provide an improved drill chuck.

Another object is the provision of such an improved drill chuck which overcomes the above-given disadvantages, that is which is solidly constructed but which also easily resists self-tightening forces in the chuck.

A further object is to provide such a chuck which is of simple construction and which is easy to assemble so it can be produced cheaply.

SUMMARY OF THE INVENTION

A drill chuck according to this invention has a chuck body centered on and adapted to be rotated about a longitudinal axis and unitarily formed with a plurality of forwardly open angled guides angularly spaced about the axis and an axially forwardly directed shoulder. Respective jaws displaceable along the guides in the chuck body are each formed with a row of teeth and a tightening sleeve rotatably surrounds the body and has an axially rearwardly directed shoulder. An inner ring rotatable on the body about the axis is formed internally with a screwthread meshing with the teeth of the jaws so that rotation of the inner ring in one direction moves the jaws radially together and opposite rotation moves them radially apart. This inner ring bears axially forward on the shoulder of the sleeve and axially backward on the shoulder of the body. Interengaging formations rotationally couple the inner ring to the sleeve and a retaining element axially fixed on the chuck body forward of the inner ring bears axially backward on the sleeve. With the system of this invention the chuck body has axially rearward of the interengaging formations a predetermined outside diameter and the sleeve has axially rearward of the interengaging formations a predetermined inside diameter greater than the outside diameter of the body. The ring has a predetermined outside diameter smaller than the inside diameter of the sleeve so that the ring can be fitted axially forward into the sleeve and the sleeve and ring together can be fitted axially backward over the body.

According to this invention the interengaging formations are an axially extending and complementary coupling ridge and groove, with the ridge formed on the sleeve and the groove on the ring. The ridge has a radially inner edges that axially forwardly approach the axis and the groove has a floor that complementary axially forwardly also approaches the axis. In addition the ring has an axially backwardly directed annular bearing surface axially confronting the shoulder of the body and the chuck further has a bearing braced axially between the bearing surface of the ring and shoulder of the body. The groove has a floor having an axial rear end radially outside the bearing and an axial front end radially inside the shoulder of the sleeve. Furthermore the bearing includes roller elements engaging the bearing surface along a circular path centered on the axis and the groove has a floor having an axial rear end radially outside the path and an axial front end radially inside the shoulder of the sleeve. The sleeve and body form an annular space in which the axial front end of the groove floor ends.

It is also possible for the sleeve to be formed with a guide ridge forming an axial backward extension of the coupling ridge. The groove has an axial rear end of a predetermined depth and the guide ridge has a predetermined height equal to less than the depth of the guide ridge.

The ring of this invention has a rear end formed with a radially projecting ridge operatively engaged with the chuck body and centered thereon. The ring also has an axially backwardly directed annular bearing surface axially confronting the shoulder of the body and the chuck further has a bearing ring braced axially backward against the shoulder of the body and inside which the ridge of the ring is fitted and roller elements engaged axially between the bearing ring and the bearing surface of the ring.

BRIEF DESCRIPTION OF THE DRAWING

The above and other objects, features, and advantages will become more readily apparent from the following, reference being made to the accompanying in which.

SPECIFIC DESCRIPTION

Figure 1:
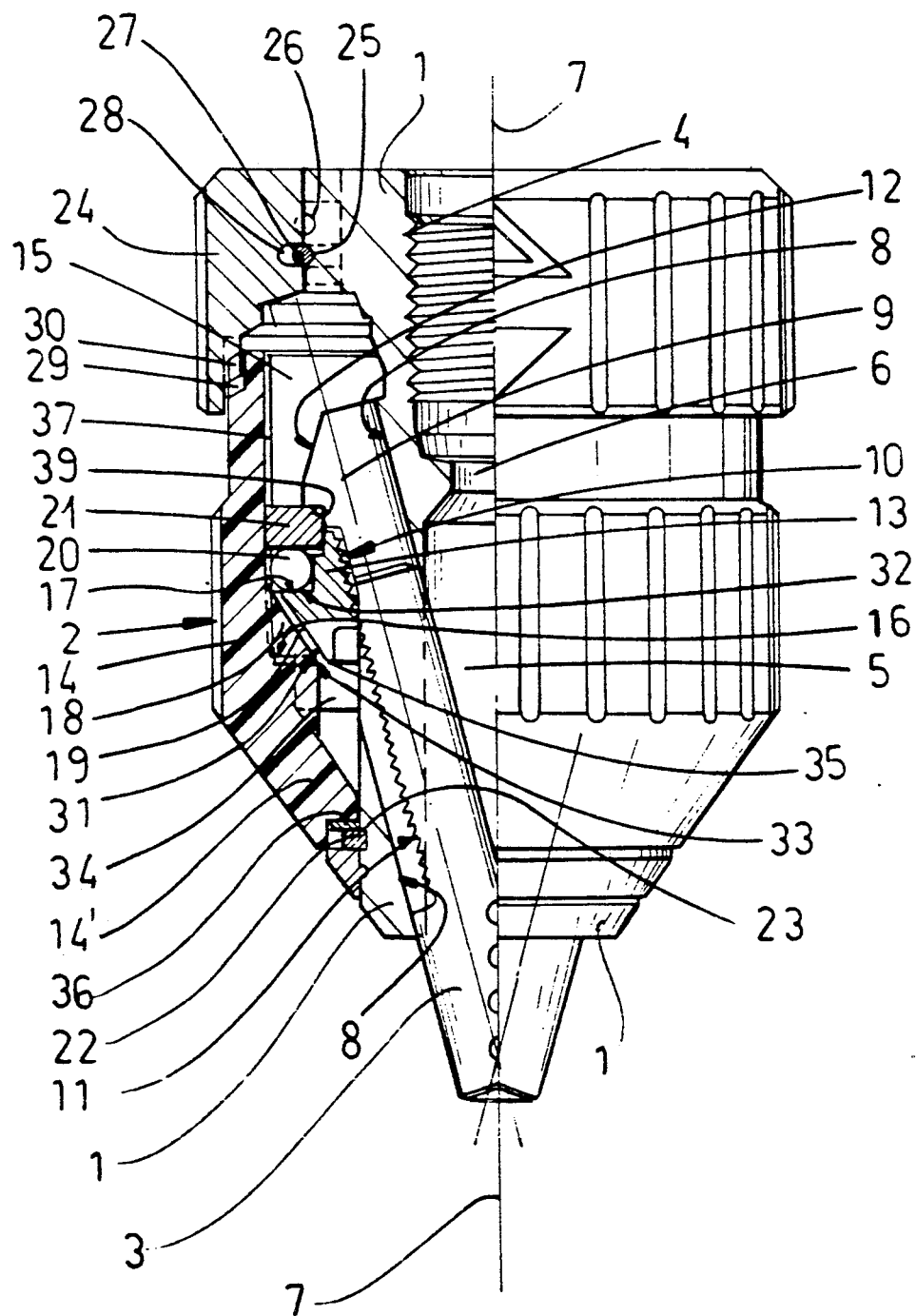
FIG. 1 is a side view partly in axial section through the chuck according to the invention.

As seen in FIG. 1 a chuck according to the invention has a one-piece steel chuck body 1 centered on and rotatable about an axis 7 and having an axially rearwardly open bore 4 adapted to receive the spindle of a drill for rotation of this body 1 about the axis 7. The body 1 is also formed with a forwardly open bore 5 and with a passage 6 axially interconnecting the coaxial bores 4 and 5 and permitting a hammer rod in the drill spindle to act directly on the rear end of a tool projecting forward from the bore 5. In addition the body 1 is formed with three angularly equispaced guide passages 8 each centered on a respective axis 9 and receiving a respective jaw 3 and each opening at its rear end at 12 along the side of the body 1 so as to define an annular space 15 therewith. The axes 9 are identically inclined to the axis 7 and are angularly equispaced about it, lying on a forwardly tapering frustocone.

A adjustment collar 2 coaxially surrounds the body 1 and is axially fixed against displacement thereon. This collar 2 is formed by an outer sleeve 14 which covers the openings 12 and may be made of a synthetic resin and a steel inner ring 13 which is formed with an internal frustoconical screw thread 10 that meshes with teeth 11 formed on the radial outer edges of the jaws 3. The ring 13 bears axially forward on a right-angle shoulder 16 formed in the sleeve 14 and has an axially backwardly directed annular surface 17 on which ride balls 20 that in turn bear axially backward on a bearing ring 21 that itself bears axially backward on a shoulder 39 formed on the body 1. The ring 13 has at its region of greatest diameter a diameter that is smaller than the inner diameter of the sleeve 14 axially backward (upward in the drawing) of the surface 16 so that this ring 13 can be inserted into the sleeve 14 from the rear.

One or more axially extending ridges 18 formed on the sleeve 14 engage in respective axially extending and complementary grooves 19 formed in the ring 13 to rotationally couple these two parts 13 and 14 together. A spring snap ring 22 is received in a radially outwardly open groove 23 formed in the front end of the chuck body and the front end of the sleeve 14 which bears forwardly via a metallic washer 36 against this ring 23. Thus forward displacement of the collar 2 formed by the parts 13 and 14 is inhibited by the ring 23 and backward displacement by the bearing 20 and ring 21.

Axially behind the tightening collar 2 is a locking ring 24 which is axially displaceable but nonrotatable on the chuck body 1. The chuck body 1 is formed level with this ring 24 with a pair of axially spaced and radially outwardly open seat-forming grooves 25 and 26. The ring 24 is formed with a deep annular groove 28 in which is seated a split snap ring 27 that can fit into either of these seat grooves 25 and 26 to define for the ring 24 two axially offset positions, namely a rear unlocked position and a front locked position. The rear edge of the adjustment sleeve 14 is formed with an array of rearwardly projecting teeth 29 and the front edge of the ring 24 is formed with an array of complementary forwardly projecting teeth 30 that can engage between the teeth 29. In the rear unlocked position, that is with the spring 27 snapped in the rear groove 26, the teeth 29 and 30 are out of mesh with each other and the sleeve 14 can rotate on the body 1 relative to the ring 24. In the front locked position these teeth 29 and 30 mesh and the sleeve 14 is rotationally locked to the ring 24 which cannot rotate on the body 1, thereby also locking the ring 13.

The ridge 18 is basically triangular in shape, extending radially inward at an acute angle to the axis 7 from the bearing surface 17 to the shoulder 16. The groove 19 in the ring 13 into which it fits deepens complementarily. Thus a floor 31 of the groove 19 lies on the side of the surface 17 radially outside its supporting part, that is radially outside the contact region 32 with the rollers 20 so that this groove 19 does not interfere with rolling of the bearing elements 20. On the side of the ring 13 opposite the bearing 20 the groove floor 31 lies radially inside an inner edge 33 of the shoulder 16. The sleeve 14 extends axially forward of the ring 13 and has a frustoconical front region 14' forming forward of the shoulder 16 and of the ring 13 an annular space 34 into which the floor 31 runs and into which a forwardly projecting ridge 35 of the ring 13 can fit. Furthermore the ring 13 has a rearwardly projecting rim or ridge 38 that fits inside the bearing ring 21 to ensure good centering of this ring 13.

Figure 2:
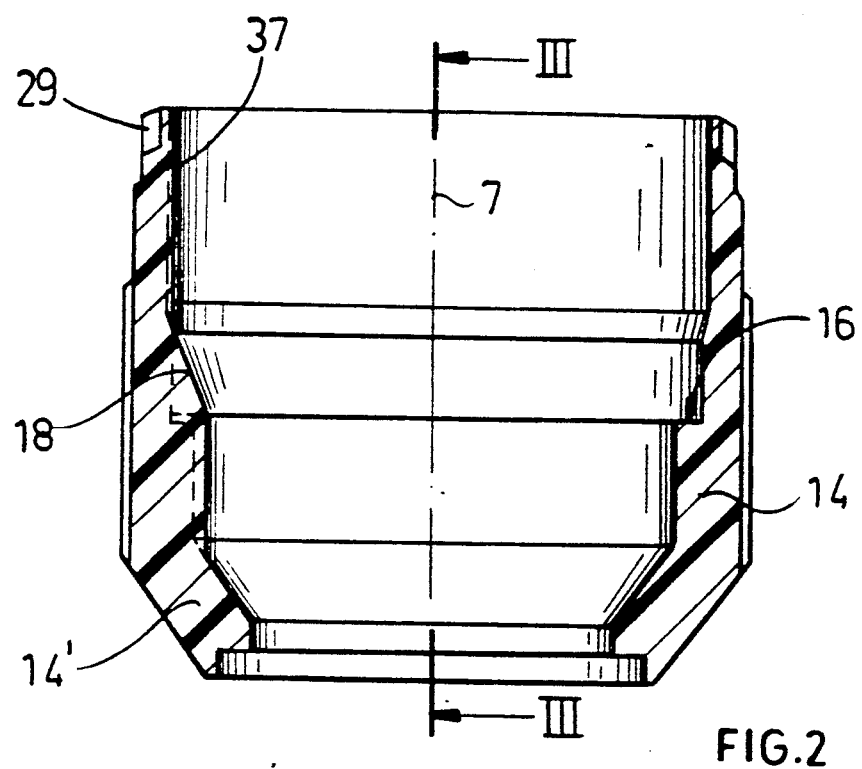
FIG. 2 is an axial section through the adjustment sleeve.
Figure 3:
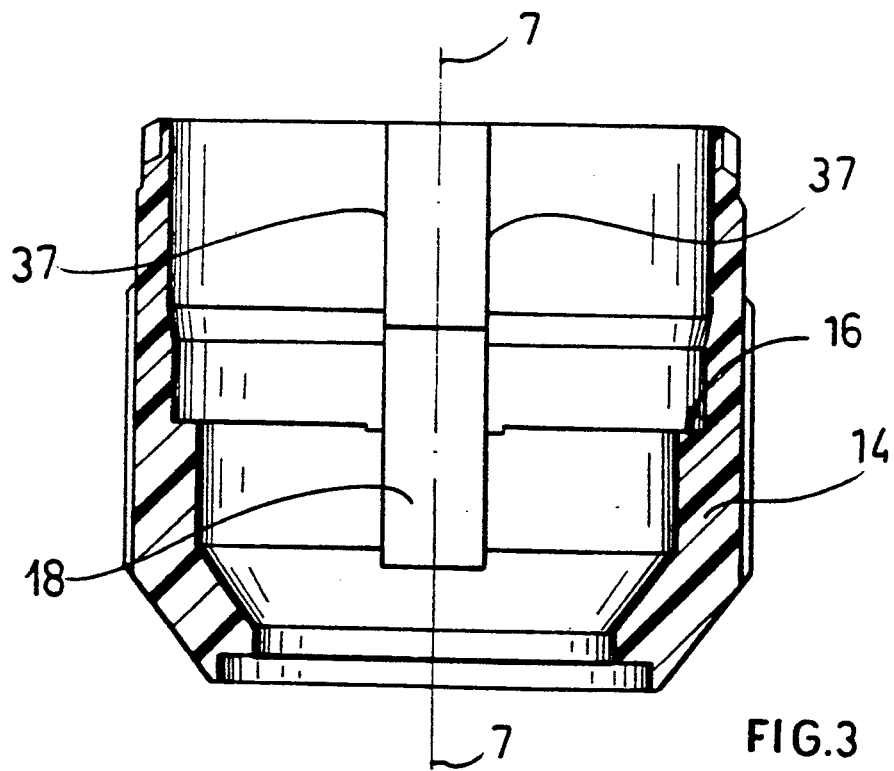
FIG. 3 is a section taken along line III—III of FIG. 2.
Figure 4:
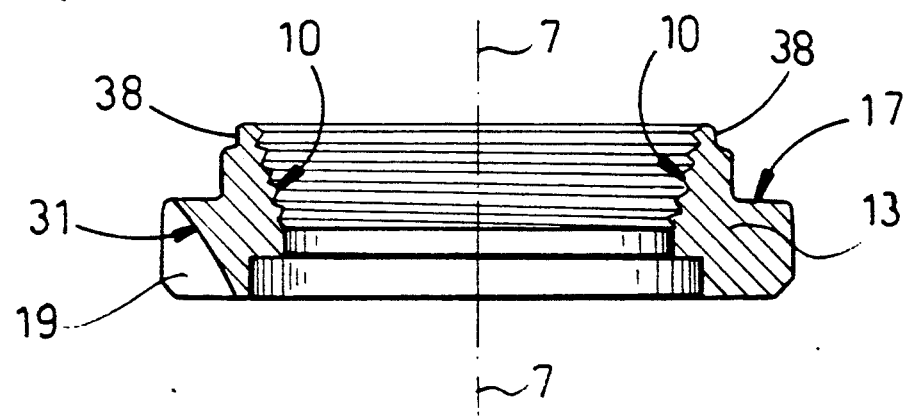
FIG. 4 is an axial section through the inner tightening ring of this invention.

In order to ease assembly of the collar 2 the sleeve 14 is formed as seen in FIG. 2 with an axially extending and inwardly projecting ridge 37 in line with the ridge 18. Thus when the ring 13 is dropped into this sleeve 14 the groove 19 can be aligned on the ridge 37 so that as it drops down in the sleeve 14 it remains aligned.

I claim:

1. A drill chuck comprising:
    a chuck body centered on and adapted to be rotated about a longitudinal axis and unitarily formed with
        a plurality of forwardly open angled guides angularly spaced about the axis and
        an axially forwardly directed shoulder;
    respective jaws displaceable along the guides in the chuck body and each formed with a row of teeth;
    a tightening sleeve rotatably surrounding the body and having an axially rearwardly directed shoulder;
    an inner ring rotatable on the body about the axis and formed internally with a screwthread meshing with the teeth of the jaws, whereby rotation of the inner ring in one direction moves the jaws radially together and opposite rotation moves them radially apart, the inner ring bearing axially forward directly on the shoulder of the sleeve and axially backward directly on the shoulder of the body;
    interengaging formations rotationally coupling the inner ring to the sleeve; and
    a retaining element axially fixed on the chuck body forward of the inner ring and bearing axially backward directly on the sleeve.

2. The drill chuck defined in claim 1 wherein the chuck body has axially rearward of the interengaging formations a predetermined outside diameter and the sleeve has axially rearward of the interengaging formations a predetermined inside diameter greater than the outside diameter of the body, the ring having a predetermined outside diameter smaller than the inside diameter of the sleeve so that the ring can be fitted axially forward into the sleeve and the sleeve and ring together can be fitted axially backward over the body.

3. The drill chuck defined in claim 1 wherein the interengaging formations are an axially extending and complementary coupling ridge and groove.

4. The drill chuck defined in claim 3 wherein the ridge is formed on the sleeve and the groove on the ring.

5. The drill chuck defined in claim 4 wherein the ridge has a radially inner edge that axially forwardly approaches the axis and the groove has a floor that complementarily axially forwardly also approaches the axis.

6. The drill chuck defined in claim 1 wherein the ring has a rear end formed with a radially projecting ridge operatively engaged with the chuck body and centered thereon.

7. The drill chuck defined in claim 6 wherein the radially projecting ridge of the ring has an axially backwardly directed annular bearing surface axially confronting the shoulder of the body, the inner ring further comprising
  a bearing ring braced axially backward against the shoulder of the body and inside which the ridge of the ring is fitted, and
  roller elements engaged axially between the bearing ring and the bearing surface of the inner ring.

8. A drill chuck comprising:
  a chuck body centered on and adapted to be rotated about a longitudinal axis and unitarily formed with
    a plurality of forwardly open angled guides angularly spaced about the axis and
    an axially forwardly directed shoulder;
  respective jaws displaceable along the guides in the chuck body and each formed with a row of teeth;
  a tightening sleeve rotatably surrounding the body and having an axially rearwardly directed shoulder;
  an inner ring rotatable on the body about the axis and formed internally with a screwthread meshing with the teeth of the jaws, whereby rotation of the inner ring in one direction moves the jaws radially together and opposite rotation moves them radially apart, the inner ring bearing axially forward on the shoulder of the sleeve and axially backward on the shoulder of the body;
  interengaging formations including an axially extending ridge formed on the sleeve and a complementary axially extending groove formed on the ring rotationally coupling the inner ring to the sleeve, the ridge having a radially inner edge that axially forwardly approaches the axis and the groove having a floor that complementarily axially forwardly also approaches the axis; and
  a retaining element axially fixed on the chuck body forward of the inner ring and bearing axially backward on the sleeve.

9. The drill chuck defined in claim 8 wherein the ring has an axially backwardly directed annular bearing surface axially confronting the shoulder of the body, the chuck further comprising
  a bearing braced axially between the bearing surface of the ring and shoulder of the body.

10. The drill chuck defined in claim 9 wherein the groove has a floor having an axial rear end radially outside the bearing and an axial front end radially inside the shoulder of the sleeve.

11. The drill chuck defined in claim 9 wherein the bearing includes roller elements engaging the bearing surface along a circular path centered on the axis, the groove having a floor having an axial rear end radially outside the path and an axial front end radially inside the shoulder of the sleeve.

12. The drill chuck defined in claim 9 wherein the sleeve and body form an annular space in which the axial front end of the groove floor ends.

13. A drill chuck comprising:
  a chuck body centered on and adapted to be rotated about a longitudinal axis and unitarily formed with
    a plurality of forwardly open angled guides angularly spaced about the axis and
    an axially forwardly directed shoulder;
  respective jaws displaceable along the guides in the chuck body and each formed with a row of teeth;
  a tightening sleeve rotatably surrounding the body and having an axially rearwardly directed shoulder;
  an inner ring rotatable on the body about the axis and formed internally with a screwthread meshing with the teeth of the jaws, whereby rotation of the inner ring in one direction moves the jaws radially together and opposite rotation moves them radially apart, the inner ring bearing axially forward on the shoulder of the sleeve and axially backward on the shoulder of the body;
  interengaging formations including an axially extending coupling ridge formed on the sleeve and a complementary axially extending groove formed on the ring rotationally coupling the inner ring to the sleeve; and
  a retaining element axially fixed on the chuck body forward of the inner ring and bearing axially backward on the sleeve, the sleeve being formed with a guide ridge forming an axial backward extension of the coupling ridge.

14. The drill chuck defined in claim 13 wherein the groove has an axial rear end of a predetermined depth and the guide ridge has a predetermined height equal to less than the depth of the guide ridge.

* * * * *